United States Patent [19]

Stribling et al.

[11] 3,831,288

[45] Aug. 27, 1974

[54] DRYING AND STERILISING APPARATUS

[75] Inventors: John Brian Stribling, Sutton Coldfield; Robert Arthur Booth, Stone, both of England

[73] Assignee: Lucas Furnace Development Limited, Wednesbury, Stafford, England

[22] Filed: Nov. 23, 1971

[21] Appl. No.: 201,377

[30] Foreign Application Priority Data
Nov. 24, 1970 Great Britain............... 55708/70
Jan. 2, 1971 Great Britain................ 190/71

[52] U.S. Cl............ 34/1, 219/10.55, 210/68, 210/73, 426/241, 426/242, 426/807
[51] Int. Cl............................................. F26b 3/34
[58] Field of Search ....... 34/1, 179, 180; 219/10.55; 198/216; 100/75, 126, 37, 38; 210/68, 73, 152, 175, 196; 426/241, 242, 807

[56] References Cited
UNITED STATES PATENTS
| | | | |
|---|---|---|---|
| 319,299 | 6/1885 | Morgan.......................... | 198/216 |
| 2,472,193 | 6/1949 | Clayton......................... | 34/1 |
| 2,511,839 | 6/1950 | Frye............................. | 34/1 |
| 2,857,907 | 10/1958 | Kaether et al................. | 34/179 |
| 2,974,420 | 3/1961 | Kearton et al................. | 34/70 |
| 3,304,991 | 2/1967 | Greenfield..................... | 210/152 |
| 3,365,562 | 1/1968 | Jeppson........................ | 34/1 |
| 3,474,544 | 10/1969 | Holden, Jr. et al............. | 34/1 |
| 3,497,452 | 2/1970 | Arvanitakis.................... | 210/73 |
| 3,700,565 | 10/1972 | Cornish et al................. | 219/10.55 |

*Primary Examiner*—Carroll B. Dority, Jr.
*Assistant Examiner*—Larry I. Schwartz
*Attorney, Agent, or Firm*—Marshall & Yeasting

[57] ABSTRACT

The invention is concerned with processing chicken etc. excrete to make cattle food or fertiliser. The excreta is mixed with water to produce a slurry and even out variations in the material utilised, and the slurry is thickened to a sludge and then to a solid, which is fragmented and passed through a micro-wave radiation dryer and steriliser: the liquid expressed in thickening is recycled, and steam evolved in sterilising is likewise recycled.

5 Claims, 4 Drawing Figures

3,831,288

DRYING AND STERILISING APPARATUS

BACKGROUND OF THE INVENTION

It is well-known that a type of animal food-stuff or fertiliser can be produced by the heat treatment of droppings (excreta) from animals, for example from intensive poultry rearing, where the material being treated is either droppings alone, or a combination of droppings with wood waste or similar material used as litter for the poultry.

The heat-treatment process used to reduce the moisture content down to approximately 10 percent transforms the material into a more easily handled powder or granular form from the original wet sticky agglomerate, and also enables the rapid separation of droppings from any accompanying litter. Since the moisture content is very high it is usual to employ large quantities of heat and air, utilising either a furnace or other means whereby heat is applied in conjunction with high speed mechanical agitation.

The disadvantages of this equipment are that the large quantities of heat and air result in a very large plant with high capital and operating costs, and imperfect control methods which provide an unevenly dried product having too much moisture or being too dry or even partly burnt with resulting loss of protein. Of possibly greater importance the product may still contain Salmonella organisms representing a danger both to the cattle eating the foodstuff and ultimately when the cattle are butchered for meat. Further the process may have an offensive odour which may be a public nuisance.

In order to operate economically, the equipment is often designed for a large throughput, and may then draw on supplies from different sources, e.g. from deep litter poultry farming, from battery (cage birds) units and so on, and the protein content may vary very considerably; the end product is variable and this too is a disadvantage.

SUMMARY OF THE INVENTION

The objects of the present invention are to provide a means of processing the droppings and material so as to avoid the use of either a furnace or of large volumes of air, resulting in more even control of the end product, absence of smell, and sterilisation which will be effective against Salmonella, and to render the end product more uniform.

In accordance with one aspect of the invention apparatus for treating material comprising animal excreta, for providing a dried granular or powder end product therefrom, is characterised by the provision of conveying means for the material, a treatment zone through which the material is conveyed, and micro-wave radiation means for drying and sterilising the material in said zone.

Also in accordance with the invention, a method of treating material comprising animal excreta for providing a dried granular or powder end product therefrom, is characterised in that the material is dried and sterilised by micro-wave radiation during conveyance.

The micro-wave sterilisation has the advantages of being particularly efficient, and of being adapted for continuous processing as distinct from batch processing: in operation steam may be evolved and itself contribute to the sterilisation, and the steam may also be used to create turbulence in a mixing tank when the fresh material is mixed with liquid to make a slurry which is compacted to feed the conveying means.

Further in accordance with the invention, apparatus for treating material comprising excreta comprises a tank for the material, a discharge path from the tank including a number of screens for separating out foreign matter, means for compacting the screened material, and means for recirculating at least part of the liquid from the compacting means to the tank.

And also in accordance with the invention, a method of treating material comprising excreta, is characterised in that the material is discharged into a liquid tank, the resultant slurry is screened to separate out foreign matter, the slurry is compacted, and the liquid expressed in compaction is at least partly recirculated to the tank.

These means, involving effectively continuous recirculation of liquid, may ensure a more constant end product, as lean material will be enriched by rich liquid from the compacting step and vice versa.

Liquid slurries are generally considered to be difficult to compact, but the invention also provides apparatus and method effective for this purpose.

According to this feature of the invention apparatus for treating material comprising excreta after admixture of the same with liquid, comprises first coarse screening means for separating large foreign bodies therefrom, second fine screening means for removing thin liquid therefrom, and a compacting press comprising a ram and a die which are both reciprocable towards and away from one another alternately, the die being perforate.

Hence the sludge delivered to the press may be charged into the die by ram movement, and after being effectively captive within the die, may be compacted with liquid expression through the die perforations by die movement relative to the ram, a previously compacted wad of material in the die serving as a relative closure for the die cavity.

DESCRIPTION OF THE PREFERRED EMBODIMENTS

Figure 4:
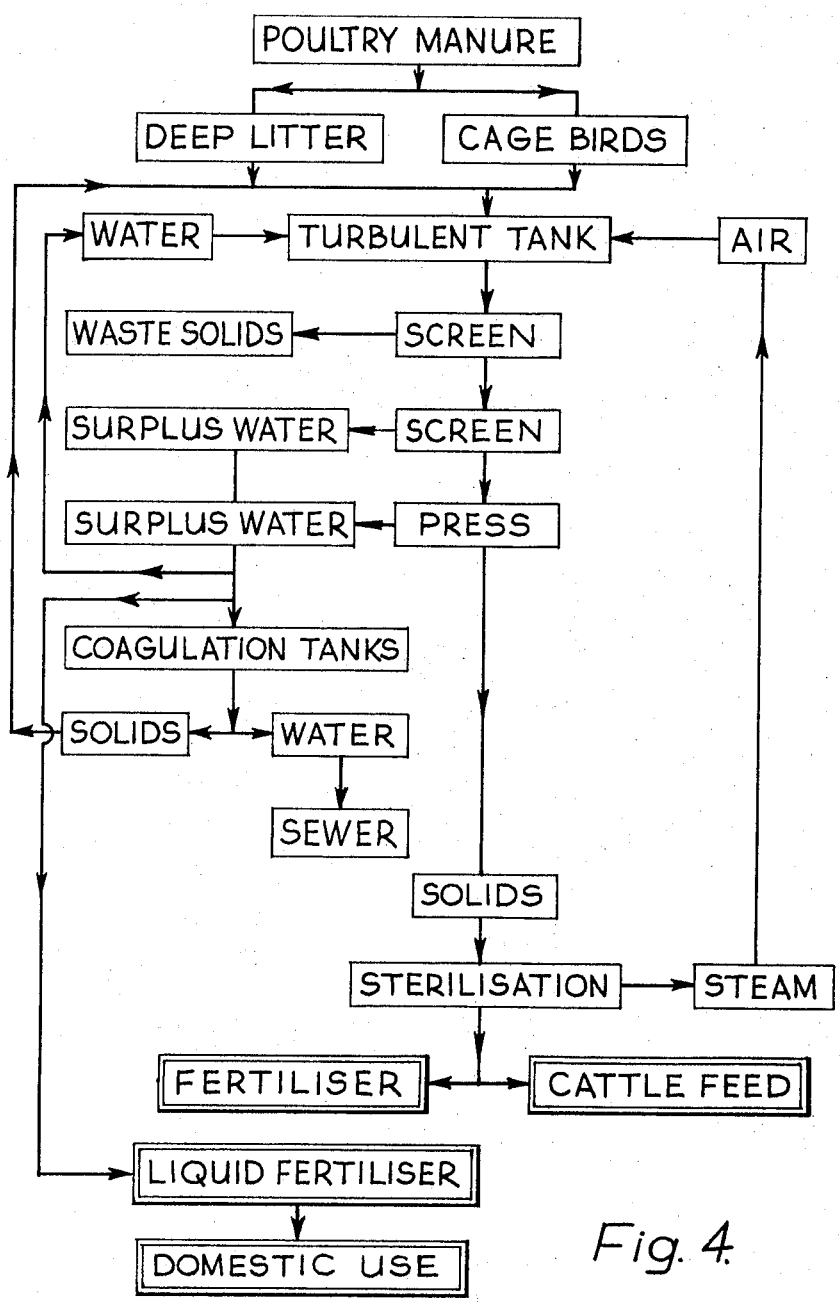
FIG. 4 is a flow diagram.

In order to understand the methods employed in the use of the apparatus, it may be most convenient to start with description of FIG. 4. As shown in FIG. 4, poultry excreta derived for example from deep litter poultry farming or from battery farming of cage birds is delivered to a turbulent tank where the material becomes admixed with water (using the term "water" to indicate a liquid which is based on water but contains solutions of the acids, proteins and the like derived from the excreta.)

From the tank a slurry is delivered to a first screen at which waste solids are removed for subsequent destruction; such solids may comprise paper, cardboard, feathers, wood shavings and the like, depending upon the origin of the material delivered to the tank. At the second screen surplus water is removed so as to convert the slurry to a sludge, and the sludge is delivered to the press where again surplus water is removed. The compacted material emergent from the press, which may be called solids, is delivered to the sterilisation means and from the sterilisation means the end product in the form of powder or granules suitable for use as fertiliser or cattle feed for example is removed.

The surplus water removed via the screen and press may be returned to the tank. The acid and protein and the like content of the water which is removed at these stages and returned to the tank will depend, inter alia, upon the richness of the slurry, and hence when the feed material delivered to the tank varies, the recirculation of this liquid will have a levelling effect so as to render the sludge relatively more uniform in protein and acid content.

A second tank may be provided for collecting the surplus water, so that this has two alternative routes, namely collection in the additional tank or return to the original turbulent tank, and the further tank may be used for coagulation, for example by adding a polyelectrolyte so as to cause sedimentation or precipitation of solids in the coagulation tank and which may be returned to the turbulent tank for use therein and for enrichment thereof. Alternatively again liquid from the further tank may be used directly as a liquid fertiliser. In the event of coagulation in the tank, surplus water may be discharged to waste.

Steam derived from the sterilisation step is used to feed the turbulent tank, both for the purpose of creating turbulence therein and thus increasing the solution rate of the added material, and also to increase the temperature of the same for the purpose of reducing the temperature differential between the sludge and the steriliser temperatures, and rendering the sterilisation step more effective.

As indicated on the flow diagram air may be delivered to the turbulent tank for the purpose of providing the turbulence with or alternatively to the steam, for example when the apparatus is first brought into use and there is no steam pressure available.

Figure 1:
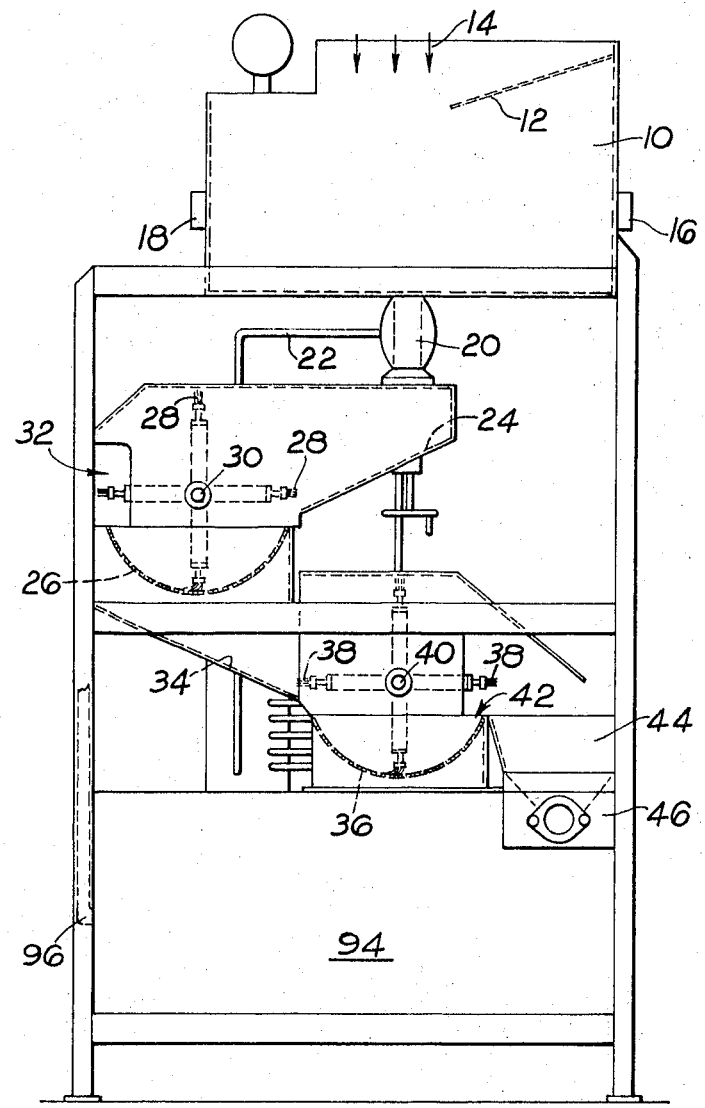
FIG. 1 is an elevation of the apparatus, being diagrammatic in form and with parts omitted for clarity.

Referring now to FIG. 1, the turbulent tank is shown therein by reference numeral 10, and is provided with a discharge ramp 12 on which incoming feed material is dumped for discharge into the tank. Steam and air nozzles are generally indicated by the arrows 14.

In order to provide a degree of process control particularly when the apparatus is to be made self-regulating as hereinafter explained, sensing means are provided for determining when the slurry in the tank 10 is of sufficient material content to provide efficient compacting at a later stage, and the sensing means may be in the form of sonics devices such as an emitter 16 and a receiver 18, for directing sonics pulses across the tank and through the contents, the strength of such pulses being selected so that scattering or interference caused by tank contents of suitable density for the compacting step will result in a weak signal or no signal at the receiver 18 and enable a control valve controlling discharge from the tank to be opened, for example automatically via relays and the like, and when a stronger signal is received at the receiver 18, the valve may be automatically closed.

Discharge from the tank may be via main passage 20 under the control of a value, for example a sphincter valve, the valve comprising essentially an outer enclosure for receiving pneumatic or hydraulic pressure via line 22 and an inner member forming the flow passage itself, the inner member being of deformable but preferably resilient material, so that fluid pressure derived from line 22 may effectively close and obturate the inner member, the fluid pressure being relieved automatically when appropriate signals are received from the sensing devices in the tank, possibly interlocked with signals from further parts of the apparatus indicating that such parts are in operative condition and relationship:

The valve 20 discharges to a chute 24 which delivers material to an arcuate screen 26 having, for example, apertures of the order of 0.25 inch or possibly 1 centimetre in diameter. The screen is associated with a set of rotating brushes 28 driven from shaft 30 by an appropriate motor, these brushes sweeping over the surface of the screen and effectively brushing the slurry through the screen but ejecting foreign material such as paper, cardboard, feathers and the like through the outlet aperture 32. Material passing through the coarse screen 26 falls onto chute 34 and is delivered to a second generally similar screen and brush set comprising fine screen 36 and brushes 38 driven from shaft 40 by a further motor. The apertures in the fine screen are of relatively small mesh size, typically of the order of 1/64 or 1/32 inch so that liquid, that is water containing possibly acids and proteins that are properly in solution therein may pass through the screen, but the mud-like sludge, thickened by the expression of water through the screen, is swept over the outlet weir 42 to fall into the compaction chamber 44.

Figure 3:
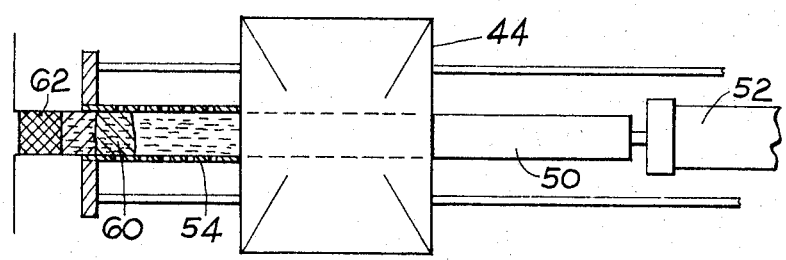
FIG. 3 is an enlarged plan showing the compacting means.

The compaction chamber is a well with tapering sides opening into a gulley 46 which is axially aligned with a pair of fluid reciprocable members. The arrangement is particularly shown in diagrammatic form, in FIG. 3 illustrating the parts in a position of maximum axial separation. The parts include ram 50 which is movable by a pneumatic or hydraulic cylinder 52 so as to project along the length of the gulley and push a mass of the slurry into a cylindrical die cavity 54. As mentioned hereinbefore, slurry is notoriously difficult to compact, and the ram 50 may operate with low efficiency, in that until the ram 50 approaches the mouth of the die 54 it may simply displace the slurry around the well, although the semiconfining wall of the gulley contributes to ensure that some slurry is pushed into the die in each ram reciprocation. With the ram in the extended position so as to close one end of the die 54, the die itself is moved by the same or another hydraulic or pneumatic ram in the opposite direction, that is towards the ram 50 so that the sludge therein has water expressed therefrom through perforations in the wall of the die, and so that a wad of compacted sludge is formed towards the end of the die remote from the ram. These operations are repeated possibly continuously, but under the control of interlock devices possibly sensing level of sludge in the well, and terminating operation when the well empties, or otherwise as may be apparent to those skilled in the art.

The outlet from the die includes a honeycomb or louvred aperture presenting a slight obstacle to the movement of compacted sludge therethrough, so that at the termination of any one set of reciprocations, a wad of the material, and generally indicated by the reference numeral 60 will remain adjacent to the honeycomb 62, and so that upon a further set of reciprocations, one portion of that wad will be pushed through the honeycomb so as to discharge wad fragments therethrough.

Figure 2:
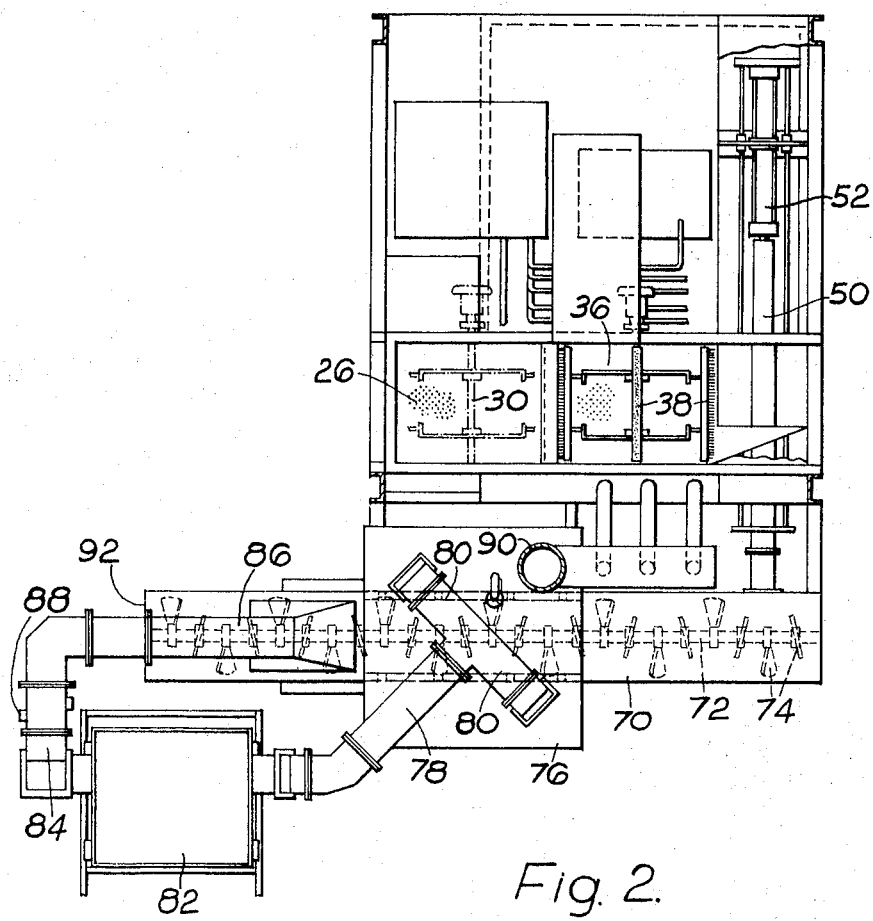
FIG. 2 is a plan view of the same apparatus.

Wad fragments are delivered direct into the steriliser unit, see particularly FIG. 2. The unit comprises a screw conveyor having a tubular outer casing 70 and an axially extending shaft 72 journalled for rotation therein and driven by a motor (not shown). The unit is an archimedes screw conveyor having interrupted flights, that is to say separate paddle like flights arranged in a helical pattern around the axis of the shaft 72, the flights 74 being individually mounted and adjustable in angle by means of clamp screws (not shown). The unit is preferably manufactured entirely from polypropylene or other plastics material suitable for use at the temperatures involved, which may be of the order of 100° C. The conveyor feeds the wad fragments axially along the conveyor in a loose state with a tumbling action. The conveyor tube extends through casing 76, the tube 70 is perforate within the casing 76 and the casing is connected by wave guides 78, 80 to micro-wave generator 82 containing a magnetron device. The micro-wave radiation generated (which is electromagnetic radiation of wave length less than 20 centimetres) is directed along the wave guides and against the exterior of the tube within the casing and passes readily through the tube 70 to be effective upon the material therewithin. The temperature of the material is raised to effect sterilisation, and drying is effected because moisture content of the material flashes off as steam which is maintained within the tube being restricted for egress from the tube by the perforations therein, and which are located solely within the casing.

The generator is air cooled and the hot air exhausting from the generator is directed by ducts 84, 86 having an auxiliary cool air inlet 88 to enable the temperature of the hot air flowing along the ducts 86 to be controlled, to the casing interior so as to air jacket the tube 70 within the casing and assist in maintaining the sterilising temperature therein. The air and steam within the casing exhaust via header 90 which is connected to the tank 10 as previously explained. The dried crumbs of material emerge from the end 92 of the tube 70 which may be connected to a bagging device or other collection means.

The screen 36 is located above a second tank 94 so as to collect the thin slurry and liquids expressed through the screen 36. The tank 94 may be connected by a pump and pipe 96 to return liquid to the tank 10 to maintain the desired level in that tank and also provided with controlled apertures so that liquid may be drawn off, for example into a tanker to be sprayed upon agricultural land as a liquid fertiliser. The tank 94 is also provided with inlet apertures for introducing coagulant so as to increase precipitation or sedimentation of entrained material which may be removed and reintroduced into tank 10 but in a more coagulated form so that upon a further passage through the apparatus a greater proportion will reach the compacting and sterilisation stages.

We claim:

1. Apparatus for treating material comprising excreta for providing a dried granular or powder end product, said apparatus comprising:
   means for conducting said material in a slurry form,
   first screening means connected to said conducting means to receive slurry therefrom and separate foreign matter from the same,
   second screening means for screening said slurry to remove moistening liquid and thereby produce a sludge,
   compacting means connected to the second screening means to receive the sludge and compact the same to express moistening liquid therefrom,
   a treatment zone,
   a microwave generator having wave guide terminals located in said zone, and
   a conveyor comprising a plastics tube and a screw conveyor therein, for conveying compacted material from the compacting means to and through said treatment zone.

2. Apparatus according to claim 1 wherein said tube is perforate within said treatment zone.

3. A method of treating material comprising poultry excreta for providing a dried granular or powder end product, said method comprising:
   mixing the material with water to produce a slurry,
   passing the slurry through first screening means to separate foreign matter therefrom,
   removing liquid from the slurry in a second screening means to produce a sludge, compacting the sludge to extract liquid therefrom,
   continuously conveying the compacted material through a treatment zone and
   subjecting the same to microwave radiation during passage through said zone.

4. A method according to claim 3 including the step of utilizing water derived from the compacting step and condensed water derived from the microwave heating step in the moistening step to produce the aforesaid slurry.

5. A method according to claim 3 including the step of separating the sludge into wads of material during compaction.

* * * * *